(12) United States Patent
Bauldock, Sr.

(10) Patent No.: US 7,490,834 B2
(45) Date of Patent: Feb. 17, 2009

(54) BOARD GAME

(75) Inventor: Gerald Bauldock, Sr., 16 Meadowbrook Pl., Willingboro, NJ (US) 08046

(73) Assignee: Gerald Bauldock, Sr., Willingboro, NJ (US)

( * ) Notice: Subject to any disclaimer, the term of this patent is extended or adjusted under 35 U.S.C. 154(b) by 377 days.

(21) Appl. No.: 11/306,649

(22) Filed: Jan. 5, 2006

(65) Prior Publication Data

US 2006/0199160 A1    Sep. 7, 2006

Related U.S. Application Data

(63) Continuation of application No. 10/605,876, filed on Nov. 3, 2003, now abandoned.

(51) Int. Cl.
*A63F 3/00*    (2006.01)

(52) U.S. Cl. ..................................... 273/273; 434/128

(58) Field of Classification Search ................. 273/243; 434/282, 128
See application file for complete search history.

(56) References Cited

U.S. PATENT DOCUMENTS 3,104,106 A * 9/1963 Kenney et al. .............. 273/249
5,071,132 A * 12/1991 Ward et al. .................. 273/243

* cited by examiner

*Primary Examiner*—Vishu K. Mendiratta

(57) ABSTRACT

A game that teaches the structures of atoms on the periodic table, molecules and ions. Teaches the concepts of ions, acids and bases, oxidation and reduction and the fundamentals of organic chemistry. The game includes a board having atoms, molecules and ions on the perimeter. In the center of the board are the periodic table, electronegativity table, a buzzer experiment representing an electrochemical cell, and table of organic nomenclature. Players are required to identify the entity on the perimeter randomly by the roll of dice and to answer questions from two levels of playing cards representing fundamental and advance.

4 Claims, 3 Drawing Sheets

BOARD GAME

CROSS REFERENCE TO RELATED APPLICATIONS

This is a continuation of US application Ser. No. 10/605,876 filed on Nov. 3, 2003.

BACKGROUND OF INVENTION

1) Field of the Invention

The invention relates to games and amusement devices and more specifically to a board game, which provides educational features relating to chemistry, as well as providing for entertainment.

Across the nation, schools are going through a major reform in their math and science curriculum to bring education standards up to par. The facts show that there is an achievement gap between blacks and whites in mathematics and science. In 1999, when the latest National Assessment of Education Progress (NAEP) test was administered, large differences remained between average scores for blacks and Hispanics on the one hand, versus whites and Asians on the other. Nationally, the achievement gap did not narrow at all during the 1990s. In reading and math, gaps separating poor and minority students from others actually widened at most grade levels and remained the same or dropped only slightly at others (The Education Trust). By the end of grade 4, African American, Latino and poor students of all races are already about two years behind other students. By the time they reach grade 8, they are about three years behind. By the time they reach grade 12, if they do so at all, minority students are about four years behind other young people. The mathematics and science skills of 17-year-old African American and Latino students are similar to those of 13-year-old white students. African Americans and Latinos obtain college degrees at only half the rate of white students. The partnerships between government agency, industry, academia and private organizations are trying to address these issues along with many others. This invention teaches the most important concepts needed to understand and excel in chemistry.

2) Prior Art

The prior art is abundant with all types of educational board games; none of which posses the unique and innovative character of the game of the present invention. Many board games require a player to travel around a peripheral path or track. The games vary with respect to their manner of play and requirement for winning. Some of these games are designed to provide entertainment for those who participate in the game. Others games are designed to provide entertainment as well as educate the player about a particular subject. Games of this type are won by the player who is able to master the subject matter that the game is intended to teach. None of the prior art board games allow for the players to move their pieces along a one directional playing track consisting of art representing atoms on the periodic table, molecules and ions. The game of the present invention, as distinguished from the prior art, include playing cards bearing questions about atoms, ions, acids and bases, oxidation and reduction, organic chemistry, electronegativity, electrochemistry (referred as the buzzer experiment) and important chemistry concepts.

SUMMARY OF INVENTION

The present invention is designed to teach the important concepts of chemistry. It is designed to provide entertainment as well as educate the players about the subject of chemistry.

One of the objectives of the present invention is to provide a board game, which includes a playing path containing the atoms of the periodic table and key molecules and ions.

Another objective is to provide a board game, which includes a periodic table, electronegativity table, a buzzer experiment representing an electrochemical cell, and table of organic nomenclature, all upon which questions are based.

Another objective is to provide a board game, which requires the identification of entities on the perimeter randomly by the roll of dice and to answer questions from two levels of playing cards representing fundamental and advance.

Still another objective of the present invention is to provide a board game, which requires a player to obtain a set amount of game money by a combination of answering questions, picking a bonus card, and randomly landing on a bonus spot on the game path. By obtaining a set amount of game money a player can win the game.

DETAILED DESCRIPTION

The present invention relates to a board game that is designed to enhance a player's knowledge of chemistry.

Figure 1:
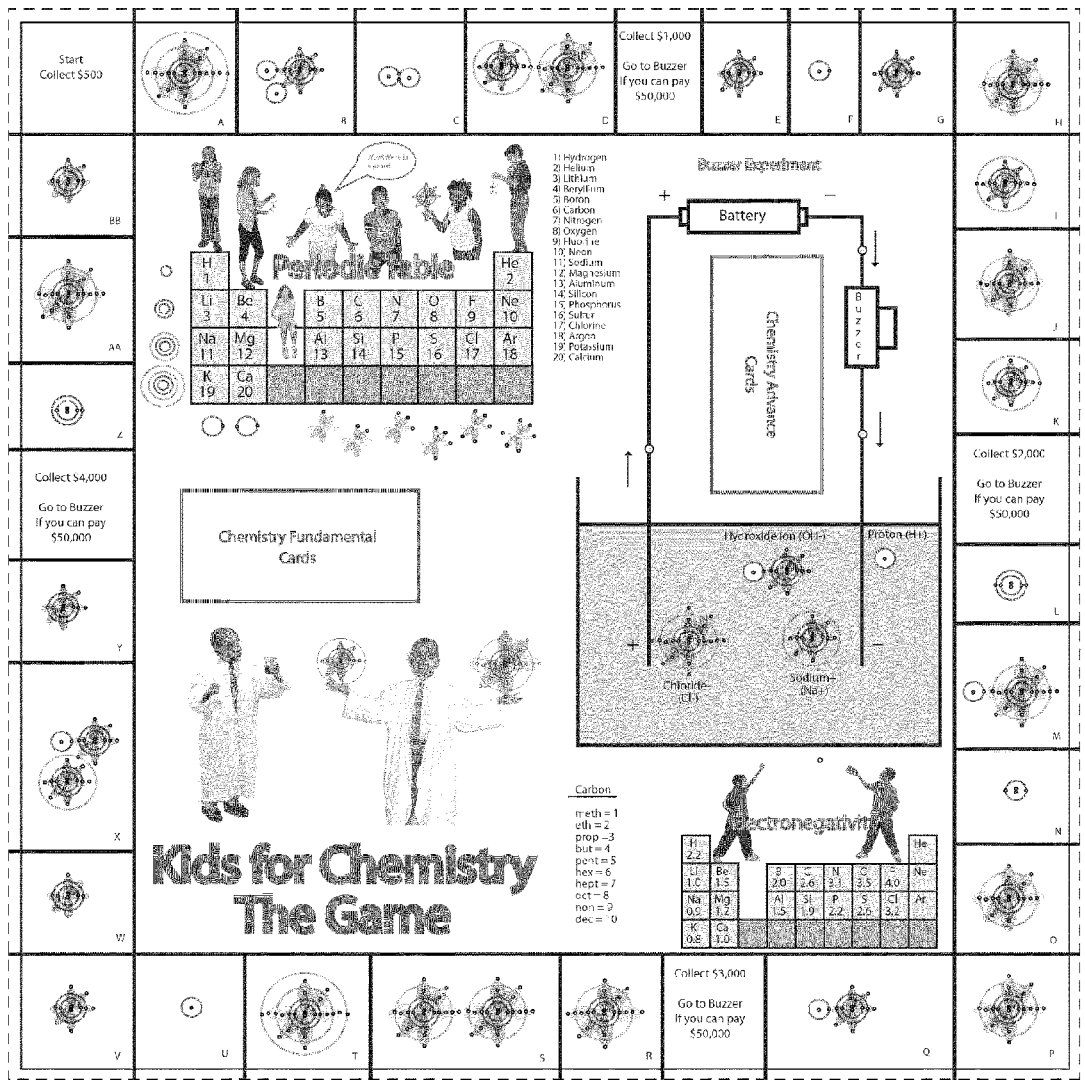
FIG. 1 is a plan view of the game board.

Referring to FIG. 1, there is a game board with a one directional playing track along which each player moves their pieces (not shown) based upon the value of the roll of a pair of dice (not shown). The die could be any standard six-sided die. Other methods of randomly selecting a number for moving the pieces could readily used in lieu of the die as, for example, a spinning arrow or the like mounted on a board with the numbers indexed to the arrow.

The playing pieces could take any suitable form such as a pawn and could be made from any suitable material. The form and material of the pieces are not material to the invention.

The track is made up of thirty-three spaces, which contain atoms from the periodic table, molecules, ions, bonus spaces and a start space.

A player that lands on one of the atoms, molecules or ion spaces must identify what they landed on. If they identify what they landed on they will be given the opportunity to win money by answering a question from one of two sets of cards, fundamental and advance. If they cannot identify what they landed on they loose the opportunity to answer a question and win money. A player can also land on one of four bonus spaces. The player will then collect the money stated on the bonus space and also gets the opportunity to win money by answering a question. Landing on a bonus space will also allow a player to move to the advance level referred to as the buzzer if they have obtained the required set dollar amount.

There are two sets of playing cards, fundamental and advance. Players that are just learning how to play the game or who have a limited knowledge of chemistry are advised to start playing at the fundamental level and cards. Players who have gained a significant knowledge of chemistry either by playing the game or having obtained the knowledge from other sources are advise to move up to the advance level and cards. Obtaining a set dollar amount while playing the game is an indicator that the player is ready to move to the advance level.

The playing cards are divided into the two groups, fundamental and advance, based on the definition of the six levels of learning as defined in the Bloom's Taxonomy. The six levels of learning are defined as 1) learning facts, 2) understanding concepts, 3) performing procedural task, 4) analysis, 5) synthesis and 6) evaluation. The fundamental cards are base on the first two levels, learning facts and understanding concepts. The advance cards are based on the remaining four levels, performing procedural tasks, analysis, synthesis and evaluation. There are approximately 200 playing cards, with questions focused on the different sections of the game board. The questions are presented on one side of the card. The corresponding answer are provided in a question and answer booklet. The opposite side of the card are label fundamental or advance. The cards could be color coded for each level and be made from any suitable material and sized for easy handling by each of the players.

Referring to FIG. 1 again, there is a periodic table showing the first twenty atoms. A table of the atoms names and numbers are shown next to the periodic table. What distinguish this invention from other inventions are the side bar and the bottom bar on the periodic table. There can be up to four S orbits in the first twenty atoms. They look like concentric circles when you put them together. The side bar shows a circle representing one S orbit next to the first row of the periodic table. There are two circles representing two S orbits next to the second row of the periodic table. There are three circles representing three S orbits next to the third row of the periodic table. And there are four circles representing four S orbits next to the fourth row of the periodic table. When looking at an atom, you can tell which row it belongs in by the number of S orbits it has. The atoms in the first row have only one S orbit. The atoms in the second row have two S orbits. The atoms in the third row have three S orbits. And the atoms in the fourth row have four S orbits. The side bar makes this very clear to the players and helps them understand the structure of the atoms.

The bottom bar shows the number of electrons that are in the outermost orbit for each column. The first column atoms will have one electron in the outermost S orbit. The atoms in the second column will have two electrons in an outermost S orbit. The atoms in the third column will have one electron in the outermost P orbit. The atoms in the fourth column will have two electrons in the outermost P orbit. The atoms in the fifth, sixth, seventh and eighth columns will have 3, 4, 5, and 6 electrons in the outermost P orbit, respectively. There are two sets of P orbits, the 2P orbits and the 3P orbits in the first twenty atoms of the periodic table. Boron to Magnesium has the 2P orbits. Aluminum to Calcium has the 2P and the 3P orbits. If we look at Calcium we can see all four S orbits and the two sets of P orbits. Each orbit has two electrons.

You can identify an atom by the number of S orbits and the number of electrons that are in the outermost orbit. There is one exception and that is Helium. Helium is located in the eighth column but does not have any P orbits. It has two electrons in an outermost S orbit like those atoms in column two. Otherwise all atoms that are in the same column will look very similar in the outermost orbit. This is an interesting observation because it is this similarity that causes atoms in the same column to have similar physical and chemical properties also. The bottom bar makes this very clear to the players and helps them understand the structure of the atoms.

Figure 2:
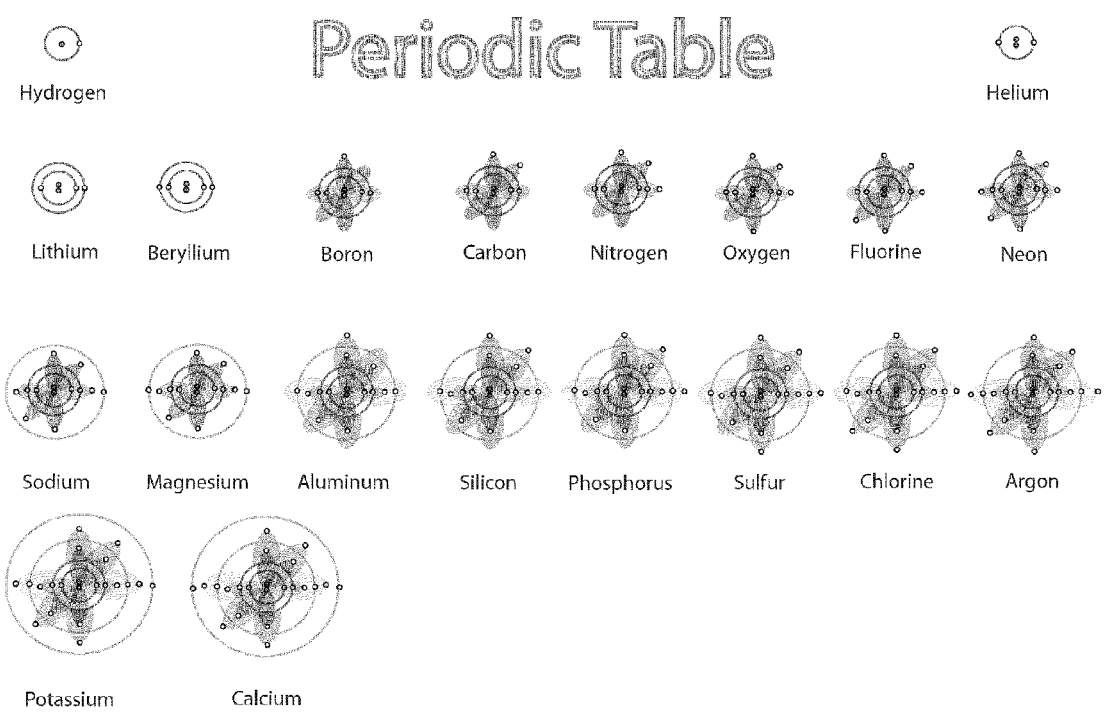
FIG. 2 is a view of the Periodic Table showing the S orbits, P orbits and the number of electrons in each orbit for each atom of the present invention.

Referring to FIG. 2, there is a second period table showing the S orbits, P orbits and the number of electrons in each orbit for the first twenty atoms of the periodic table. This is another distinguishing feature of this invention from other inventions, which clearly explains the following concepts: The first twenty atoms have two types of orbits. They are called S orbits, which are round and spherical. And there are P orbits, which are shaped like the number 8. P orbits are in three directions. There is a P orbit in the y direction, in the x direction, and the z direction. And when you put the Py, Px and Pz orbits together they form a three dimensional shape.

Electrons will orbit around the nucleus of the atom in either an S orbit or a P orbit. Even though S and P orbits look different, they are very much alike. Orbits are capable of having a maximum of two electrons. Sometimes an orbit will only have one electron in it. But we can think of this electron as being lonely. It will want to have another electron in the same orbit. And if another electron comes along and makes a pair of electrons in one orbit, then we can consider the electrons to be happy.

Figure 3:
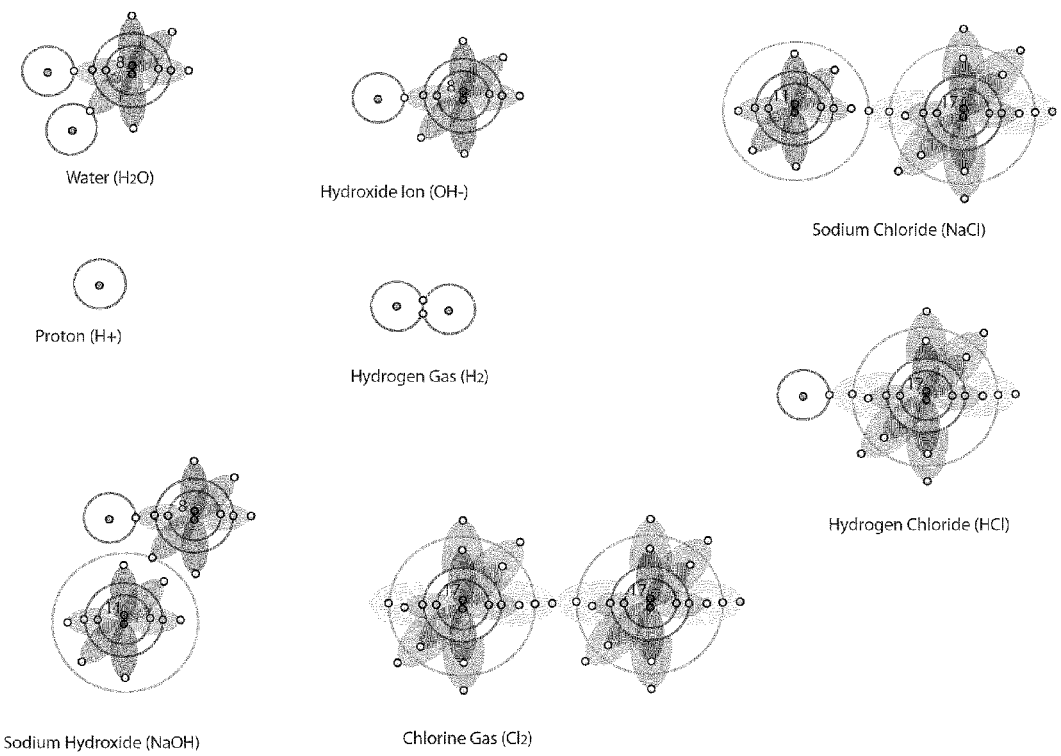
FIG. 3 is a view of the molecules and ions used in the present invention.

Referring to FIG. 3, there is a table showing molecules and ions with their S orbits and P orbits and sharing of electrons. This is another distinguishing feature of this invention from other inventions, which clearly explains the following concepts: You can put atoms together just like building blocks. But when you put atoms together, they are called molecules. Now there is a trick to building molecules. Orbits are capable of having a maximum of two electrons. Sometimes an orbit will only have one electron in it. But we can think of this electron as being lonely. It will want to have another electron in the same orbit. And if another electron comes along and makes a pair of electrons in one orbit, then we can consider the electrons to be happy. Just remember that electrons always want to be in pairs. For example, if you look at Hydrogen, you can see that it has one electron in the 1S orbital. It is a lonely electron. Oxygen also has one electron in two of its P orbitals. In this case, the 1S has two electrons, the 2S has two electrons, the Py has two electrons while the Px and the Pz have only one electron each. The Px and Pz electrons are both lonely. No electron wants to be lonely, so a wonderful thing happens between Oxygen and the two Hydrogens. They share the electrons. One of the Hydrogens is sharing an electron with the Px orbit, and the other Hydrogen is sharing an electron with the Pz orbit. Now all the electrons are happy. They are all in pairs. They will stay that way until something forces them away. That is the secret to building all molecules, sharing electrons.

You can distinguish atoms from molecules in the game by looking at the S orbits. If all the S orbits are in concentric circles then you have an atom. If the S orbits are not concentric and you see an S orbit that lies outside another S orbit, then you have a molecule.

Referring to FIG. 1, there is a section called the buzzer experiment, which represents an electrochemical cell. This is another distinguishing feature of this invention from other inventions. The buzzer section provides examples of ions, acid and base chemistry, oxidation and reduction and electronegativity. The buzzer experiment represents a small circuit, built out of a buzzer connected to a battery by wires. When the wires are open you hear no sound. But when the wires are closed the buzzer rings. When you take the wires of the buzzer circuit and stick both ends in a container of pure water without touching the wires the buzzer will not ring. Now add ordinary table salt to the water and do not let the wires touch. The buzzer rings. The chemistry behind this experiment is the basis of many questions in the game cards.

Referring to FIG. 1, there is a table entitled Electronegativity. This is another distinguishing feature of this invention from other inventions. This invention teaches the concept of electronegativity explained as follows: When it comes to taking electrons, some atoms are stronger than others. The stronger atoms are able to take electrons away from the weaker atoms. The ability to take electrons is measured by the electronegativity. The numbers that are under the atoms in the electronegativity table are showing the electronegativity strength. Let's focus on columns one and seven. Fluorine (F) has an electronegativity of 4.0 and is stronger than Lithium (Li), which has an electronegativity of 1.0. So Fluorine is four times stronger than Lithium. If there were a tug of war between Fluorine and Lithium, then Fluorine would win. The same thing with Chlorine (Cl) and Sodium (Na). Chlorine has an electronegativity of 3.2, and Sodium has an electronegativity of 0.9. So Chlorine is stronger than Sodium. And if they were both pulling on an electron, than Chlorine would win. Helium (He), Neon (Ne), and Argon (Ar) do not have values for electronegativity. These are the noble gases and are very stable. Because they are so stable, they do not want to share electrons with any other atom. They do not want to give electrons. They do not want to take electrons.

Referring to FIG. 1, there is a Table of Organic Nomenclature entitled "Carbon". This is another distinguishing feature of this invention from other inventions. This invention teaches the nomenclature for carbon base molecules described as follows: There is something very important about molecules that are based on the atoms, Carbon (C), Oxygen (O), and Hydrogen (H). All things that are naturally grown in nature are based on these atoms. For instance, trees, grass, and flowers are made mostly of Carbon, Oxygen, and Hydrogen. And trees, grass and flowers are called organic. So that is a good way to define organic chemistry, the chemistry of molecules that are based on Carbon, Oxygen, and Hydrogen. Carbon plays a big role in organic chemistry and often serves as the backbone of many molecules. Carbon loves to attach itself to itself. So you can end up with molecules that become long chains of carbon. They could look like this, (C—C—C—C—C—C—C—C—C—C—C—C—C—C—C). There is a system used for counting the number of carbons in a molecule. Let's start with a molecule containing one carbon. Carbon has four bonds, there must be four hydrogen atoms attached to it. The word that means one is "meth." In other words, meth means one carbon. Since there are only single lines (single bonds) attaching the carbon to other atoms, then you can put the letters, "ane" after meth. ("ane" means single bond.) So the name of the molecule with one carbon and four hydrogen is methane. When there are two carbons in a molecule, then you would use the word "eth". In other words, eth means two carbons. Two carbons are attached to each other with a single line (single bond). All the other bonds are single lines. So we can call this molecule, ethane. With this method you can name carbon molecules up to 10 (Decane) using the table.

What is claimed is:

1. A board game for teaching atomic, molecular and ionic structure comprising:
   a game path having a plurality of spaces along a periphery of the game board;
   a first plurality of said spaces having pictorial representations of atoms contained in a periodic table of elements, molecules and ions represented by their "S" orbitals and "P" orbitals, each pictorial representation being selected from (a) one or more concentric circles representing "S" orbits and a number of electrons in each orbit or (b) one or more concentric circles in combination with other orbits as in the shape of numerical 8 representing "P" orbits and a number of electrons in each orbit;
   a second plurality of said spaces having pictorial representations of molecules as a combination of two or more atoms, each atom having a pictorial representation selected from (a) one or more concentric circles representing "S" orbits and a number of electrons in each orbit or (b) one or more concentric circles in combination with other orbits as in the shape of numerical 8 representing "P" orbits and a number of electrons in each orbit;
   a third plurality of spaces having pictorial representations of ions as a single atom or as a combination of two or more atoms minus electrons or addition of electrons, each atom having a pictorial representation selected from (a) one or more concentric circles representing "S" orbits and a number of electrons in each orbit or (b) one or more concentric circles in combination with other orbits as in the shape of numerical 8 representing "P" orbits and a number of electrons in each orbit;
   a fourth plurality of said spaces being bonus spaces having monetary indicia and action indicia for collecting the monetary indicia; and
   a first inner area of the game board having a first table of spaces in rows and columns, each space having a name and a number corresponding to one each of twenty atoms, and a side bar outside the first table showing a circle or a plurality of concentric circles representing number of "S" orbitals corresponding to each row, and a bottom bar outside the first table representing the number of electrons in the outermost orbit of each atom in the column;
   a second inner area of the game board having a second table of spaces in rows and columns, each space having a name and an electro-negativity number corresponding to one each of twenty atoms;
   a third inner area of the game board having a table defining organic nomenclature;
   a fourth inner area of the game board having a pictorial representation of an electrochemical cell.

2. The board game board in claim 1, wherein a player landing on a playing space is required to identify the atom, molecule or ion represented by the space.

3. The board game in claim 1 having a set of cards having questions and answers relating to the atoms in periodic table, molecules and ions.

4. The board game in claim 1 having game pieces and a set of dice, wherein game pieces are moved according to a roll of said dice.

* * * * *